(12) United States Patent
Sugamata et al.

(10) Patent No.: US 11,584,332 B2
(45) Date of Patent: Feb. 21, 2023

(54) SEAT BELT DEVICE

(71) Applicant: HONDA MOTOR CO., LTD., Tokyo (JP)

(72) Inventors: Yoshihisa Sugamata, Wako (JP); Naotoshi Takemura, Wako (JP); Kazuo Imura, Wako (JP); Yusuke Nakamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 620 days.

(21) Appl. No.: 16/494,172

(22) PCT Filed: Mar. 17, 2017

(86) PCT No.: PCT/JP2017/010920
§ 371 (c)(1),
(2) Date: Sep. 13, 2019

(87) PCT Pub. No.: WO2018/167945
PCT Pub. Date: Sep. 20, 2018

(65) Prior Publication Data
US 2020/0010046 A1    Jan. 9, 2020

(51) Int. Cl.
*B60R 22/26* (2006.01)
*B60R 22/20* (2006.01)
*B60N 2/20* (2006.01)

(52) U.S. Cl.
CPC .............. *B60R 22/20* (2013.01); *B60R 22/26* (2013.01); *B60N 2/20* (2013.01); *B60R 2022/208* (2013.01)

(58) Field of Classification Search
CPC .......................... B60R 22/26; B60R 2022/208
See application file for complete search history.

(56) References Cited

U.S. PATENT DOCUMENTS 4,627,639 A * 12/1986 Sedlmayr .............. B60R 22/201
280/801.2
4,892,331 A *  1/1990 Wollner ................ B60R 22/201
411/401
(Continued)

FOREIGN PATENT DOCUMENTS

DE        2810577 A1 *  9/1979
EP        1607286 A1 * 12/2005    ........... B60R 22/023
(Continued)

OTHER PUBLICATIONS

Machine translation of FR 2655300 [Retrieved from Internet on Feb. 10, 2022]. (Year: 2022).*
(Continued)

*Primary Examiner* — Barry Gooden, Jr.
(74) *Attorney, Agent, or Firm* — Carrier Shende & Associates, P.C.; Fulchand P. Shende; Joseph P. Carrier

(57) ABSTRACT

In the present invention, a seatbelt device is provided with: a seat state determination unit that determines the state of a seat; a movable support section that supports a seatbelt within a range of possible movement on a seat back; a movement mechanism that, with a motor, moves the movable support section within the range of possible movement; and a motor control unit that controls the motor in accordance with the usage state of the seat determined by the seat (Continued)

state determination unit. Due to this configuration, the position of the seatbelt is made optimal for an occupant, and the comfort of the occupant is thus improved.

3 Claims, 11 Drawing Sheets

(56) References Cited

U.S. PATENT DOCUMENTS

| | | | | |
|---|---|---|---|---|
| 5,358,310 | A | * | 10/1994 | Nemoto ................ B60R 22/201 |
| | | | | 297/483 |
| 5,390,982 | A | * | 2/1995 | Johnson ................ B60N 2/829 |
| | | | | 297/483 |
| 5,658,048 | A | * | 8/1997 | Nemoto ................ B60R 22/20 |
| | | | | 297/410 |
| 5,845,000 | A | * | 12/1998 | Breed ................ B60R 21/0136 |
| | | | | 348/143 |
| 6,145,881 | A | * | 11/2000 | Miller, III ................ B60R 22/20 |
| | | | | 280/808 |
| 6,802,537 | B1 | * | 10/2004 | Tolfsen ................ B60N 2/508 |
| | | | | 280/805 |
| 7,980,635 | B2 | * | 7/2011 | Matsushita ............ B60R 22/03 |
| | | | | 297/483 |
| 2009/0322141 | A1 | | 12/2009 | Matsushita |
| 2016/0214565 | A1 | * | 7/2016 | Bell ................ B60R 22/12 |

FOREIGN PATENT DOCUMENTS

| | | | | |
|---|---|---|---|---|
| EP | 2119605 A1 | * | 11/2009 | ............ B60R 22/20 |
| FR | 2655300 A1 | * | 6/1991 | |
| GB | 1405468 A | * | 9/1975 | ............ B60R 22/04 |
| JP | 2002-240682 A | | 8/2002 | |
| JP | 2006-082703 A | | 3/2006 | |
| JP | 2010-149832 A | | 7/2010 | |
| JP | 2011-251577 A | | 12/2011 | |
| JP | 2014-166807 A | | 9/2014 | |
| JP | 2015-054560 A | | 3/2015 | |
| WO | WO-0126937 A1 | * | 4/2001 | ............ B60N 2/508 |
| WO | WO-0226561 A2 | * | 4/2002 | ............ B60R 22/20 |
| WO | 2007/052437 A1 | | 5/2007 | |
| WO | WO-2018157016 A1 | * | 8/2018 | |

OTHER PUBLICATIONS

PCT/ISA/210 from International Application PCT/JP2017/010920 with the English translation thereof.

* cited by examiner

SEAT BELT DEVICE

TECHNICAL FIELD

The present invention relates to a seat belt device (occupant protection device) in which all support parts, that support a seat belt, are provided on, and attached to a seat.

BACKGROUND ART

In recent years, a vehicle in which a disposition (position or direction) of a seat is changed freely has been examined in order to improve the comfort in a vehicle compartment for a vehicle occupant. If a support part (anchor) that supports a seat belt is provided on and attached to a floor panel or a pillar of the vehicle, it is difficult to change the disposition of the seat. Thus, in a case where the disposition of the seat can be changed freely, it is preferable to use a seat belt device in which all of the support parts are provided on, and attached to the seat.

International Publication No. WO 2007/052437 discloses a vehicle occupant restraint device including an air belt that expands in the occurrence of a collision. In this occupant restraint device, a support part of a seat belt and the air belt can move with a seat in a front-rear direction.

SUMMARY OF INVENTION

Incidentally, from the viewpoint of further improvement of the comfortability for the vehicle occupant, there is room for improvement in the current seat belt.

The present invention has been made in view of the above problem, and an object is to provide a seat belt device that can improve the comfort for a vehicle occupant.

The present invention provides a seat belt device in which all of support parts that support a seat belt are provided to a seat, and the seat belt device includes: a seat state determination unit configured to determine a state of the seat; a movable support part configured to support the seat belt in a movable range that is set to a seat back; a movement mechanism configured to move the movable support part in the movable range with a motor; and a motor control unit configured to control the motor in accordance with a use state of the seat that is determined by the seat state determination unit.

By the above structure, the position where a vehicle occupant is restrained by the seat belt can be changed in accordance with the use state of the seat. As a result, the position of the seat belt becomes optimum for the vehicle occupant. Thus, the vehicle occupant feels more comfortable.

The seat state determination unit may include a seat angle determination unit configured to determine an inclination angle of the seat back, and the motor control unit may be configured to control the motor in accordance with the inclination angle that is determined by the seat angle determination unit.

By the above structure, the position of the seat belt is decided in accordance with the inclination angle of the seat back. Thus, the position of the seat belt becomes optimum for the vehicle occupant. Therefore, the vehicle occupant feels more comfortable.

The motor control unit may be configured to control the motor in a manner that, as the seat back is inclined more to a rear side of the seat, the movable support part is positioned on a lower end side of the movable range.

By the above structure, as the seat back is inclined more, the support part is lowered more so that the vehicle occupant feels as if being restrained by the seat belt at two points. Thus, the degree of freedom for the vehicle occupant can be improved without a substantial influence on the restraint.

The seat state determination unit may include a vehicle occupant determination unit configured to determine a physique or a posture of a vehicle occupant who is seated on the seat, and the motor control unit may be configured to control the motor in accordance with the physique or the posture of the vehicle occupant that is determined by the vehicle occupant determination unit.

By the above structure, the position of the seat belt is decided in accordance with the physique or the posture of the vehicle occupant. Thus, the position of the seat belt becomes optimum for the vehicle occupant. Therefore, the vehicle occupant feels more comfortable.

If the physique of the vehicle occupant is larger than a predetermined physique, the motor control unit may control the motor in a manner that the movable support part is positioned on an upper part of the movable range, and if the physique of the vehicle occupant is smaller than the predetermined physique, the motor control unit may control the motor in a manner that the movable support part is positioned on a lower part of the movable range.

By the above structure, if the size of the vehicle occupant is large, the movable support part is positioned on the upper part, and if the size of the vehicle occupant is small, the movable support part is positioned on the lower part. Thus, the position of the seat belt becomes optimum for the vehicle occupant. Therefore, the vehicle occupant feels more comfortable.

The motor control unit may be configured to control the motor in accordance with a position of a predetermined part of the vehicle occupant.

By the above structure, the position of the movable support part is controlled in accordance with the position of the predetermined part of the vehicle occupant. Thus, the position of the seat belt becomes optimum for the vehicle occupant. Therefore, the vehicle occupant feels more comfortable.

The vehicle occupant determination unit may be configured to determine an upper limit position to which the movable support part can move, on a basis of the physique or the posture of the vehicle occupant, and the motor control unit may be configured to control the motor so as to cause the movable support part to approach the upper limit position.

By the above structure, the upper limit position of the movable range of the movable support part can be changed for each vehicle occupant. Thus, the position of the seat belt becomes optimum for the vehicle occupant. Therefore, the vehicle occupant feels more comfortable. Moreover, the vehicle occupant can be appropriately restrained.

The vehicle occupant determination unit may be configured to determine the upper limit position on a basis of a position of an arm of the vehicle occupant.

By the above structure, the appropriate position can be determined easily as the upper limit position of the movable range.

The vehicle occupant determination unit may be configured to determine the position of the arm of the vehicle occupant depending on whether the vehicle occupant holds a steering wheel.

By the above structure, the upper limit position of the movable range can be easily determined.

The seat belt device may further include a collision prediction unit configured to predict a collision of a vehicle, wherein if the collision prediction unit predicts the collision, the motor control unit may control the motor in a manner that the movable support part is positioned on an upper part of the movable range.

By the above structure, the movable support part is positioned on the upper part of the movable range before the occurrence of the collision. Thus, the vehicle occupant can be more appropriately restrained.

DESCRIPTION OF EMBODIMENTS

Preferred embodiments of a seat belt device according to the present invention are hereinafter described with reference to the attached drawings. Note that in the description below, front and rear refer to a front-rear direction of a vehicle 10 (FIG. 4), left and right refer to a left-right direction in a vehicle width direction, and up and down refer to an up-down direction of the vehicle 10, unless otherwise stated.

The present invention can be applied to an automated driving vehicle and a manual driving vehicle. Automated driving herein described refers to a concept that includes not just "fully automated driving" in which travel control of the vehicle 10 is fully automated but also "partially automated driving" or "driving assistance" in which the travel control of the vehicle 10 is partially automated. In the vehicle 10 that is assumed in the present specification, each of driving force control, braking control, and steering control can be switched between automated control and manual control.

1. Seat 16

Figure 1:
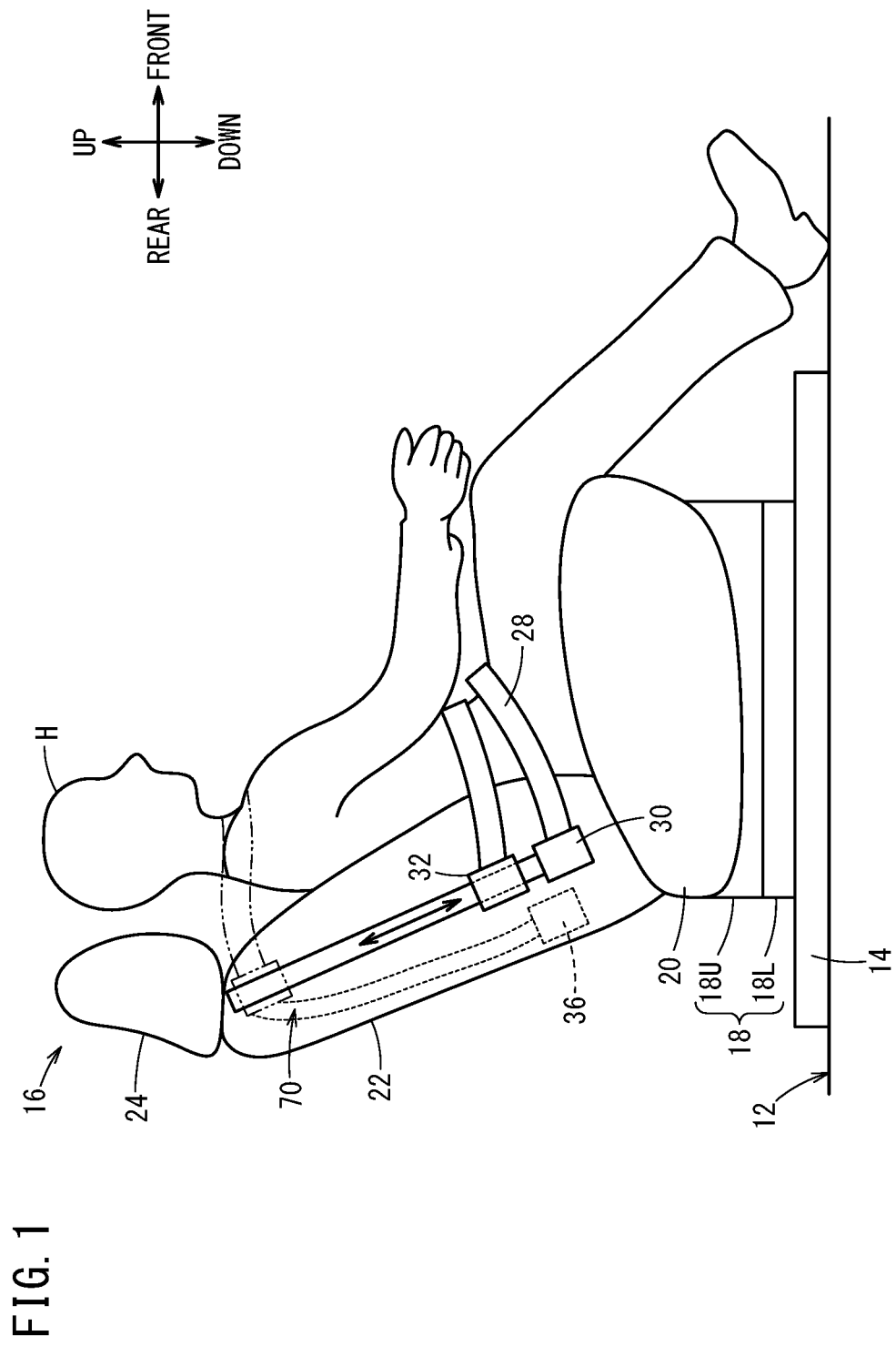
FIG. 1 is a left side view that illustrates a seat to which a seat belt device is provided and a vehicle occupant.
Figure 2:
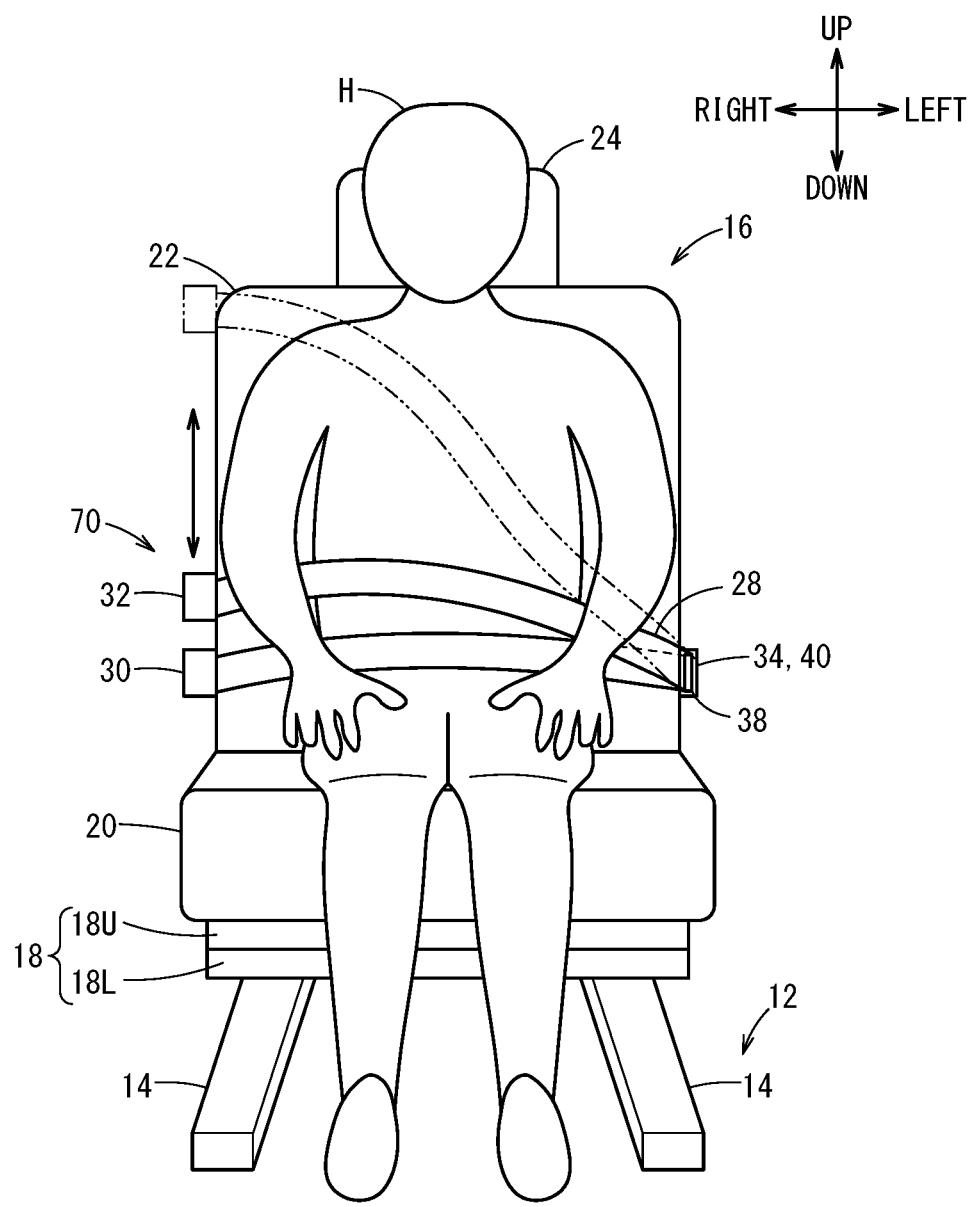
FIG. 2 is a front view that illustrates the seat to which the seat belt device is provided and the vehicle occupant.

As illustrated in FIG. 1 and FIG. 2, to a floor panel 12 of the vehicle 10, a plurality of rails 14 that are parallel to the front-rear direction of the vehicle 10 are attached. The seat 16 includes a base 18, a seat cushion 20, a seat back 22, and a headrest 24. The base 18 is supported in a state where the base 18 is movable in the front-rear direction of the vehicle 10 along the rail 14. The seat cushion 20 is fixed to an upper part of the base 18. The seat back 22 extends upward from a rear end of the seat cushion 20. The headrest 24 is fixed to an upper end of the seat back 22. The base 18 includes a base lower part 18L that is movable along the rail 14, and a base upper part 18U to which the seat cushion 20 is fixed. The base upper part 18U can rotate with respect to the base lower part 18L using an axis (not shown) that is parallel to a direction that is approximately perpendicular to the floor panel 12 as a center.

To a right side part of the seat back 22, a fixed support part 30 and a movable support part 32 that support a seat belt 28 are provided. To a left side part of the seat back 22, a left support part 34 that supports the seat belt 28 is provided. Inside the seat back 22, a retractor 36 is provided. The seat belt 28 is provided between the retractor 36 and the fixed support part 30 through the movable support part 32. Moreover, a tongue plate 38 is provided to the seat belt 28 between the fixed support part 30 and the movable support part 32. The tongue plate 38 can slide with respect to the seat belt 28. If the tongue plate 38 is inserted into a buckle 40 that is provided to the left support part 34, the seat belt 28 restrains a vehicle occupant H with three points of the fixed support part 30, the left support part 34, and the movable support part 32.

The fixed support part 30 is provided near a lower end of the right side part of the seat back 22. The left support part 34 is provided near a lower end of the left side part of the seat back 22. On the other hand, the movable support part 32 is provided above the fixed support part 30, and is movable in the up-down direction along a right side surface of the seat back 22 in a movable range that is defined by a movement mechanism 42 (FIG. 3).

2. Movement Mechanism 42

Figure 3:
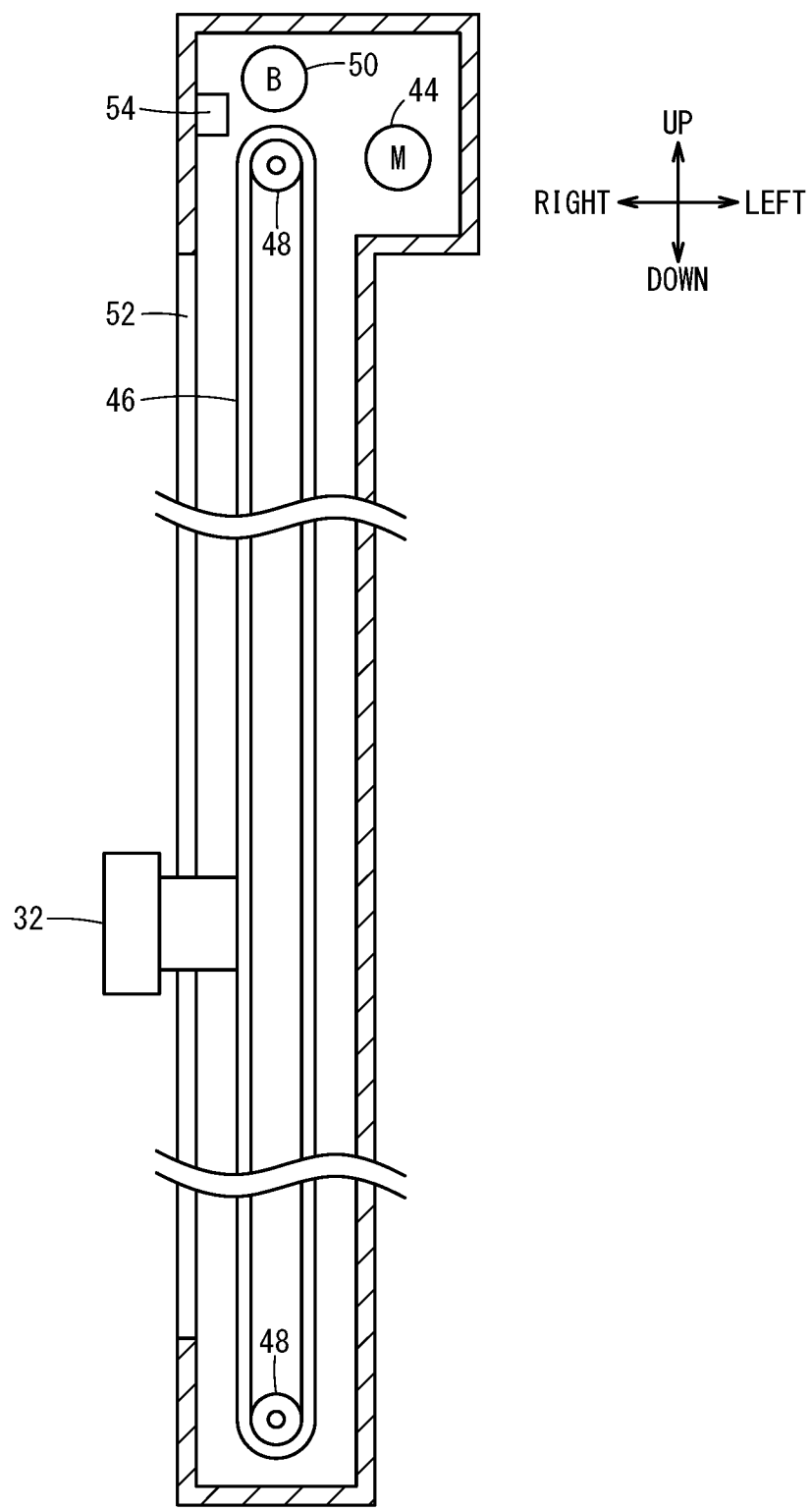
FIG. 3 is a structure diagram of a movement mechanism.

As illustrated in FIG. 3, the movement mechanism 42 includes a motor 44 as a driving source, a belt member 46 and a pulley 48 that convert rotation movement of the motor 44 into linear movement of the movable support part 32 in the up-down direction, a brake 50 that applies braking force to an operation part regarding the liner movement of the movable support part 32, a guide 52 that guides the movable support part 32 in the up-down direction, and a driving circuit (not shown) for the motor 44 and the brake 50. The movable support part 32 is connected to the belt member 46. Moreover, to the movement mechanism 42, a position sensor 54 that detects the position of the movable support part 32 in the up-down direction is provided.

When the motor 44 drives forward, the pulley 48 rotates forward and the belt member 46 that is looped over the pulleys 48 rotates forward. As the pulley 48 rotates, the movable support part 32 moves forward, for example, to the up direction along the guide 52. When the motor 44 drives backward, the pulley 48 rotates backward and the belt member 46 that is looped over the pulleys 48 rotates backward. As the pulley 48 rotates, the movable support part 32 moves backward, for example, to the down direction along the guide 52. The movable support part 32 is movable from an upper end to a lower end of the guide 52. This range is the movable range of the movable support part 32. The upper end of the guide 52 is a mechanical upper limit position, and the lower end of the guide 52 is a mechanical lower limit position. The brake 50 operates while the motor 44 stops, so as to keep the movable support part 32 at a stop position.

Note that the structure of the movement mechanism 42 illustrated in FIG. 3 is one example. The structure of the movement mechanism 42 is not limited thereto. In other words, any structure that can move the movable support part 32 between one point and another point in the movable range can be employed.

3. System Configuration of Vehicle 10 Including Seat Belt Device 70

A system configuration of the vehicle 10 is described with reference to FIG. 4 and FIG. 5. As described above, the vehicle 10 according to the present embodiment can be switched between the automated control and the manual control. A system configuration regarding the automated driving and a system configuration of a seat belt device 70 are hereinafter described individually.

[3.1. System Configuration Automated Driving]

The vehicle 10 includes a driving operation ECU 60, and a driving force device 62, a steering device 64, and a braking device 66 that are controlled by the driving operation ECU 60. The driving operation ECU 60 is configured by one or a plurality of ECUs, and includes a storage device and various function achievement units. The function achievement unit is a software function unit in which a function is achieved when a CPU (central processing unit) executes programs stored in the storage device. Note that the function achievement unit can also be achieved by a hardware function unit that includes an integrated circuit such as an FPGA (Field-Programmable Gate Array). A seat belt ECU 78 to be described below can also be achieved by a hardware function unit, similarly to the driving operation ECU 60. In the automated driving, the driving operation ECU 60 acquires information that is necessary for the automated driving from external environment sensors 72, vehicle sensors 74, and the like to be described below, recognizes external environment information and host vehicle information, creates an action plan, and outputs to the driving force device 62, the steering device 64, and the braking device 66, a control instruction in order to travel in accordance with the action plan.

The driving force device 62 includes a driving force ECU and a driving source including an engine or traction motor, and performs an acceleration/deceleration operation in accordance with the control instruction that is output from the driving operation ECU 60. The steering device 64 includes an EPS (electric power steering system) ECU and an EPS actuator, and performs a steering operation in accordance with the control instruction that is output from the driving operation ECU 60. The braking device 66 includes a brake ECU and a brake actuator, and performs a braking operation in accordance with the control instruction that is output from the driving operation ECU 60.

[3.2. System Configuration of Seat Belt Device 70]

Figure 4:
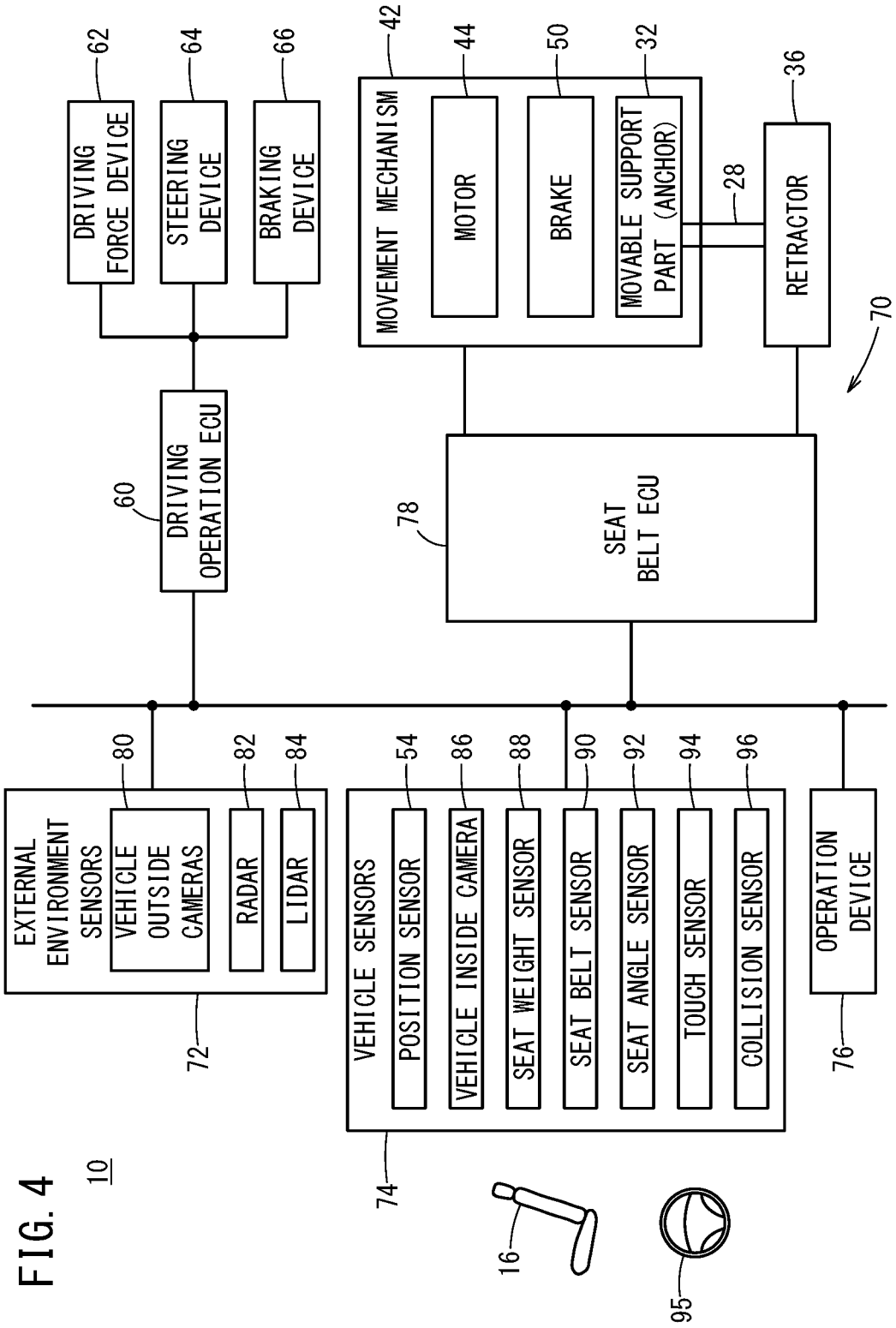
FIG. 4 is a system configuration diagram of a vehicle that includes the seat belt device.
Figure 5:
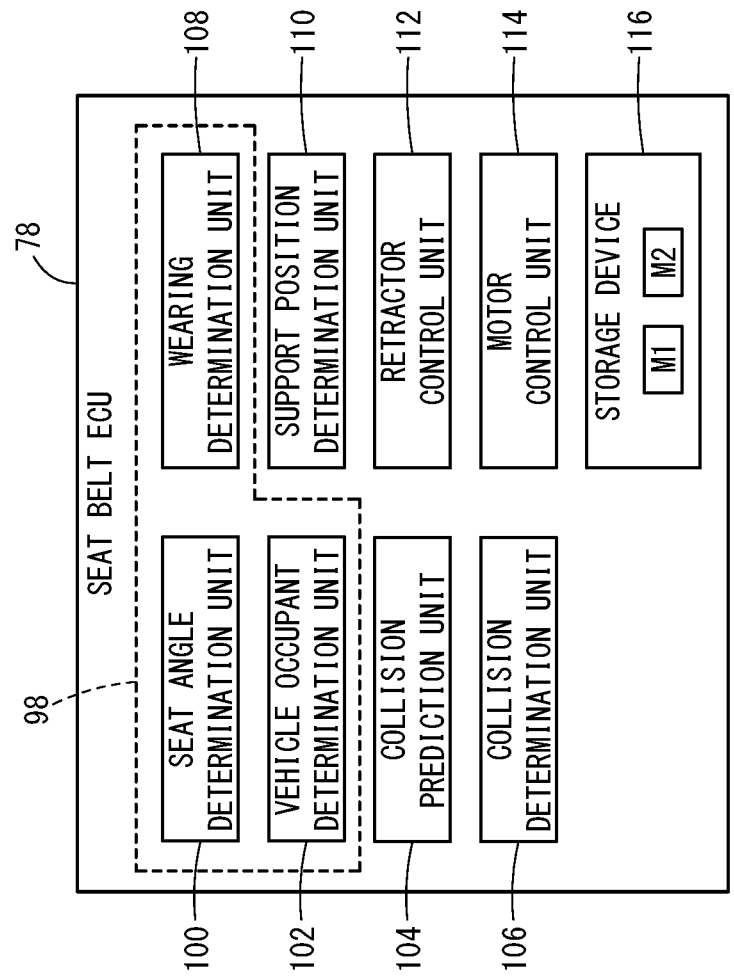
FIG. 5 is a function block diagram of a seat belt ECU.

As illustrated in FIG. 4 and FIG. 5, the seat belt device 70 includes the external environment sensors 72, the vehicle sensors 74, an operation device 76, the seat belt ECU 78, the movement mechanism 42, the retractor 36, and the seat belt 28.

The external environment sensors 72 acquire information that expresses an external environment state of the vehicle 10 (hereinafter, referred to as external environment information), and output the external environment information to the driving operation ECU 60 and the seat belt ECU 78. The external environment sensors 72 include a plurality of vehicle outside cameras 80 that photograph the periphery of the vehicle 10, and a radar 82 and a LIDAR 84 that detect an object around the vehicle 10. The external environment sensors 72 further include each device that is not shown, for example, a navigation device, a communication device that communicates with the outside (for example, a road side machine, a broadcasting station, another vehicle), or the like.

The vehicle sensors 74 acquire information that expresses a state of the vehicle 10 itself (hereinafter, referred to as vehicle information), and output the vehicle information to the driving operation ECU 60 and the seat belt ECU 78. The vehicle sensors 74 include the position sensor 54 that detects the position of the movable support part 32, a vehicle inside camera 86 that photographs the inside of a vehicle compartment of the vehicle 10, a seat weight sensor 88 that detects the weight of the vehicle occupant H who is seated on the seat 16, a seat belt sensor 90 that detects whether the seat belt 28 is worn, a seat angle sensor 92 that detects an inclination angle of the seat back 22, a touch sensor 94 that detects whether the vehicle occupant H holds a steering wheel 95, and a collision sensor 96 that detects a collision of the vehicle 10. The collision sensor 96 includes, for example, a G sensor and a pressure sensor. The vehicle sensors 74 include each sensor that is not shown, for example, a vehicle speed sensor that detects the speed of the vehicle (vehicle speed), a yaw rate sensor, an azimuth sensor, an inclination sensor, an accelerator pedal sensor, a brake pedal sensor, a steering angle sensor, or the like.

Note that the inclination angle of the seat back 22 that is detected by the seat angle sensor 92 corresponds to an angle of a reference line of the seat back 22 with respect to the up-down direction. In the present specification, the reference line of the seat back 22 is an axis of a seat back frame (not shown) that extends upward. However, the reference line of the seat back 22 can be set appropriately. For example, a torso line in design may be set as the reference line, or a line that connects a rotation axis of the inclination and an upper vertex of the seat back 22 in a center of the seat back 22 in a width direction may be set as the reference line.

As illustrated in FIG. 5, the seat belt ECU 78 includes, as the function achievement units, a seat angle determination unit 100, a vehicle occupant determination unit 102, a collision prediction unit 104, a collision determination unit 106, a wearing determination unit 108, a support position determination unit 110, a retractor control unit 112, and a motor control unit 114. In addition, the seat belt ECU 78 includes a storage device 116. The seat angle determination unit 100, the vehicle occupant determination unit 102, and the wearing determination unit 108 function as a seat state determination unit 98 that determines a state of the seat 16, for example, whether the vehicle occupant H is seated on the seat 16, whether the seat back 22 is inclined, or the like.

The seat angle determination unit 100 determines the inclination angle of the seat back 22 on the basis of a detection result from the seat angle sensor 92. The vehicle occupant determination unit 102 determines whether the vehicle occupant H is seated on the seat 16 on the basis of image information that is acquired by the vehicle inside camera 86 or a detection result from the seat weight sensor 88. The collision prediction unit 104 calculates the distance and the relative speed between the vehicle 10 and an obstacle on the basis of a detection result from the radar 82 or the LIDAR 84, and if the distance is less than or equal to a predetermined distance and the relative speed is more than or equal to predetermined speed, the collision prediction unit 104 predicts that the collision of the vehicle 10 will occur. The collision determination unit 106 determines whether the collision of the vehicle 10 has occurred on the basis of a detection result from the collision sensor 96.

The wearing determination unit 108 determines whether the vehicle occupant H wears the seat belt 28 on the basis of a detection result from the seat belt sensor 90. The support position determination unit 110 determines the position of the movable support part 32 on the basis of a detection result from the position sensor 54. If the collision determination unit 106 detects the collision, the retractor control unit 112 outputs an operation instruction to the retractor 36. The motor control unit 114 controls the motor 44 on the basis of at least one of determination results from the seat state determination unit 98 and the support position determination unit 110, and a prediction result from the collision prediction unit 104. The storage device 116 stores various kinds of programs, numerals (predetermined values), maps M1, M2, or the like.

4. Process Performed in Seat Belt Device 70

Specific examples of the process that is performed in the seat belt device 70 are hereinafter described. Note that each process to be described below is repeatedly performed at predetermined time intervals.

[4.1. First Process]

A first process is described with reference to FIG. 6. In step S1, the wearing determination unit 108 determines whether the seat belt 28 is worn on the basis of the detection result from the seat belt sensor 90. If the seat belt 28 is worn (step S1: YES), the process advances to step S2. On the other hand, if the seat belt 28 is not worn (step S1: NO), the process is terminated once and the start of the next process is awaited.

When the process has advanced from step S1 to step S2, the seat angle determination unit 100 determines whether the inclination angle of the seat back 22 is changed on the basis of the detection result from the seat angle sensor 92.

If the inclination angle is changed (step S2: YES), the process advances to step S3. On the other hand, if the inclination angle is not changed (step S2: NO), the process is terminated once and the start of the next process is awaited.

When the process has advanced from step S2 to step S3, the motor control unit 114 controls the support position by the movable support part 32 in accordance with the inclination angle of the seat back 22. The storage device 116 stores the map M1 that shows the relation between the inclination angle of the seat back 22 based on the up-down direction and the position of the movable support part 32 (height from lower limit position), for example. In this map M1, as the inclination angle is larger, that is, as the seat back 22 is inclined more to a rear side of the seat 16, the position of the movable support part 32 comes to a lower end side of the movable range. The motor control unit 114 acquires from the map M1, a target position of the movable support part 32 in accordance with the inclination angle of the seat back 22 that is determined by the seat angle determination unit 100. Moreover, the support position determination unit 110 determines the current position of the movable support part 32 on the basis of the detection result from the position sensor 54. The motor control unit 114 calculates the control amount to cause the current position of the movable support part 32 to approach the target position, and outputs an operation instruction to the movement mechanism 42. The movement mechanism 42 releases the brake 50 in accordance with the operation instruction and drives the motor 44.

[4.2. Second Process]

A second process is described with reference to FIG. 7. The process performed in step S11 is the same as the process performed in step S1 in the first process shown in FIG. 6.

When the process has advanced from step S11 to step S12, the vehicle occupant determination unit 102 determines whether the size of the body of the vehicle occupant H is larger than a predetermined size on the basis of the image information from the vehicle inside camera 86 or the detection result from the seat weight sensor 88. For example, the vehicle occupant determination unit 102 determines the size of the vehicle occupant H by image recognition processing, and compares this size of the vehicle occupant H with the virtual size of the vehicle occupant H that is stored in the storage device 116. Alternatively, the vehicle occupant determination unit 102 compares the weight of the vehicle occupant H with a predetermined weight that is stored in the storage device 116. If the size of the body of the vehicle occupant H is larger than or equal to the predetermined size (step S12: YES), the process advances to step S13. On the other hand, if the size of the body of the vehicle occupant H is smaller than the predetermined size (step S12: NO), the process advances to step S15.

When the process has advanced from step S12 to step S13, the support position determination unit 110 determines the current position of the movable support part 32 on the basis of the detection result from the position sensor 54, and compares this current position with a predetermined position that is stored in the storage device 116. If the current position of the movable support part 32 is lower than the predetermined position (step S13: YES), the process advances to step S14. On the other hand, if the current position of the movable support part 32 is higher than or at the same position as the predetermined position (step S13: NO), the process is terminated once and the start of the next process is awaited.

When the process has advanced from step S13 to step S14, the motor control unit 114 raises the support position by the movable support part 32. For example, the motor control unit 114 sets the target position of the movable support part 32 to the upper limit position that is stored in the storage device 116, calculates the control amount to cause the current position of the movable support part 32 to approach the target position, and outputs the operation instruction to the movement mechanism 42. The movement mechanism 42 releases the brake 50 in accordance with the operation instruction and drives the motor 44. At this time, the state of the vehicle occupant H may be recognized on the basis of the image information from the vehicle inside camera 86, and for example, the possible upper limit position may be determined from the position of the shoulder, the arm, the underarm, or the like.

When the process has advanced from step S12 to step S15, the support position determination unit 110 determines the current position of the movable support part 32 on the basis of the detection result from the position sensor 54, and compares this current position with the predetermined position that is stored in the storage device 116. If the current position of the movable support part 32 is higher than the predetermined position (step S15: YES), the process advances to step S16. On the other hand, if the current position of the movable support part 32 is lower than or at the same position as the predetermined position (step S15: NO), the process is terminated once and the start of the next process is awaited.

When the process has advanced from step S15 to step S16, the motor control unit 114 lowers the support position by the movable support part 32. For example, the motor control unit 114 sets the target position of the movable support part 32 to the lower limit position that is stored in the storage device 116, calculates the control amount to cause the current position of the movable support part 32 to approach the target position, and outputs the operation instruction to the movement mechanism 42. The movement mechanism 42 releases the brake 50 in accordance with the operation instruction and drives the motor 44.

[4.3. Third Process]

A third process is described with reference to FIG. 8. The process performed in step S21 is the same as the process performed in step S1 in the first process shown in FIG. 6.

When the process has advanced from step S21 to step S22, the motor control unit 114 controls the support position by the movable support part 32 in accordance with the position of a predetermined part of the body of the vehicle occupant H. The predetermined part of the body may be, for example, the shoulder, a part or all of the head, a part or all of the arm, the chest, or the like. The position of one predetermined part may be determined, or the positions of a plurality of predetermined parts may be determined. The storage device 116 stores the map M2 that shows the relation between the position of the predetermined part of the body and the upper limit position of the movable support part 32, for example. The image information from the vehicle inside camera 86 is input to the vehicle occupant determination unit 102, and the vehicle occupant determination unit 102 determines the position of the predetermined part of the body of the vehicle occupant H by the image recognition processing. The motor control unit 114 acquires from the map M2, the target position of the movable support part 32 in accordance with the position of the predetermined part that is determined by the vehicle occupant determination unit 102. Moreover, the support position determination unit 110 determines the current position of the movable support part 32 on the basis of the detection result from the position sensor 54. The motor control unit 114 calculates the control amount to cause the current position of the movable support part 32 to approach the target position, and outputs an operation instruction to the movement mechanism 42. The movement mechanism 42 releases the brake 50 in accordance with the operation instruction and drives the motor 44.

[4.4. Fourth Process]

A fourth process is described with reference to FIG. 9. The process performed in step S31 is the same as the process performed in step S1 in the first process shown in FIG. 6.

When the process has advanced from step S31 to step S32, the vehicle occupant determination unit 102 determines whether the vehicle occupant H holds the steering wheel 95 on the basis of the image information from the vehicle inside camera 86 or a detection result from the touch sensor 94. For example, the vehicle occupant determination unit 102 determines the posture of the vehicle occupant H by the image recognition processing, and compares this posture with the virtual posture of the vehicle occupant H that is stored in the storage device 116. Alternatively, the vehicle occupant determination unit 102 compares an electric signal value of the touch sensor 94 and a predetermined electric signal value that is stored in the storage device 116. When the vehicle occupant H holds the steering wheel 95 (step S32: YES), the process advances to step S33. On the other hand, if the vehicle occupant H does not hold the steering wheel 95 (step S32: NO), the process advances to step S35.

Figure 7:
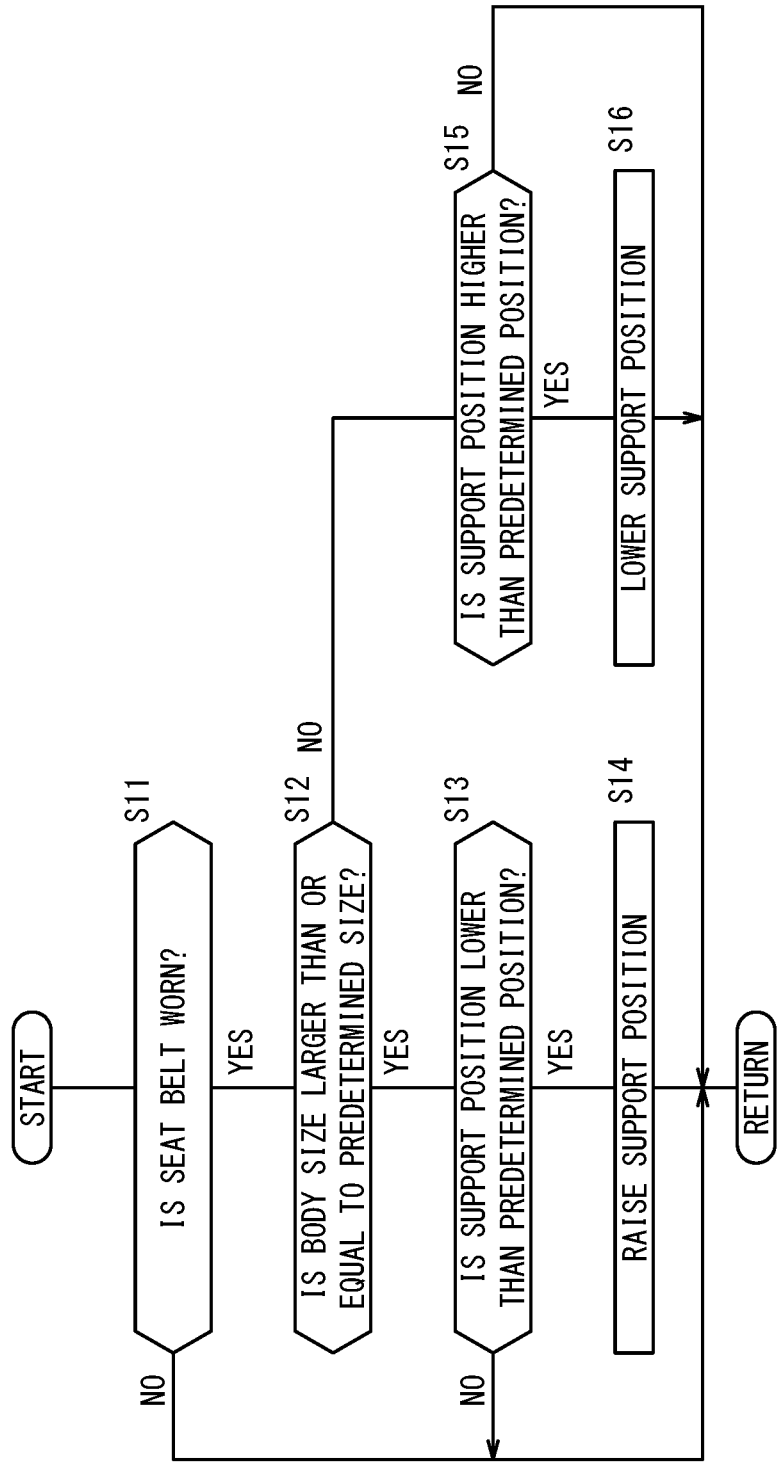
FIG. 7 is a flowchart of a second process.

The process performed in step S33 to step S36 is the same as the process performed in step S13 to step S16 in the second process shown in FIG. 7.

[4.5. Fifth Process]

A fifth process is described with reference to FIG. 10. The process performed in step S41 is the same as the process performed in step S1 in the first process shown in FIG. 6.

When the process has advanced from step S41 to step S42, the collision prediction unit 104 predicts whether the collision will occur on the basis of a detection result from the external environment sensor 72. When it is predicted that the collision will occur (step S42: YES), the process advances to step S43. On the other hand, if it is not predicted that the collision will occur (step S42: NO), the process is terminated once and the start of the next process is awaited.

The process performed in step S43 and step S44 is the same as the process performed in step S13 and step S14 in the second process shown in FIG. 7.

5. Another Embodiment

Figure 11:
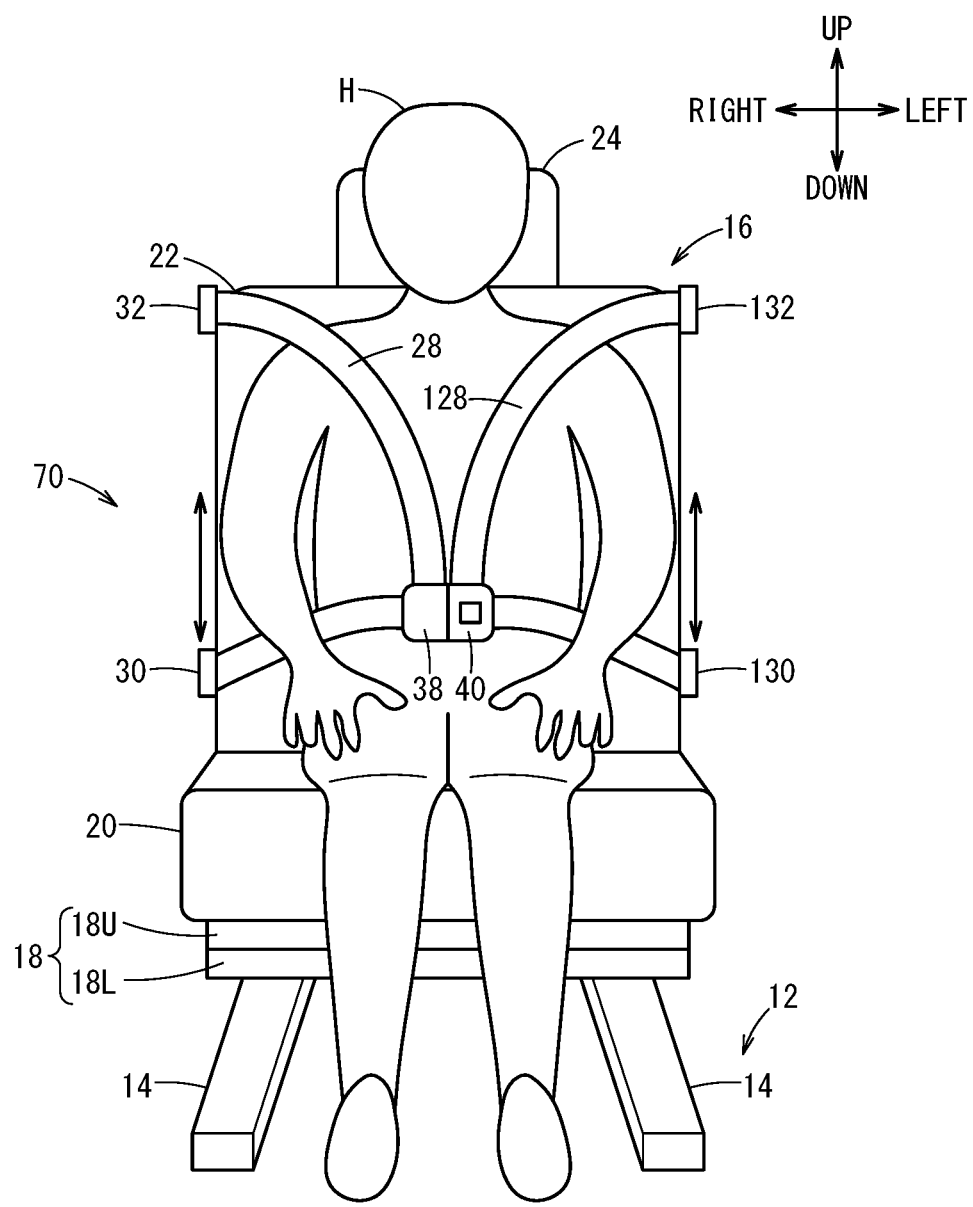
FIG. 11 is a front view that illustrates a seat to which a seat belt device according to another embodiment is provided and a vehicle occupant.

In the embodiment described above with reference to FIG. 1 and FIG. 2, the present invention is applied to the seat belt device 70 including the three-point support structure. The present invention can also be applied to the seat belt device 70 including a four-point support structure illustrated in FIG. 11. Note that in FIG. 11, the same structure as that in FIG. 1 and FIG. 2 is designated by the same reference symbol.

Similarly to the right side part of the seat back 22, to the left side part of the seat back 22, a fixed support part 130 and a movable support part 132 that support a seat belt 128 are provided. Inside the seat back 22, a retractor (not shown) other than the retractor 36 (FIG. 2) is provided. The seat belt 128 is provided between the retractor (not shown) and the fixed support part 130 through the movable support part 132. Moreover, to the seat belt 128 between the fixed support part 30 and the movable support part 32, the buckle 40 that can slide with respect to the seat belt 128 is provided. If the tongue plate 38 provided to the seat belt 28 is inserted into the buckle 40 provided to the seat belt 128, the seat belt 128 restrains the vehicle occupant H with four points of the fixed support part 30, the movable support part 32, the fixed support part 130, and the movable support part 132.

The fixed support part 130 is provided near a lower end of the left side part of the seat back 22. On the other hand, the movable support part 132 is provided above the fixed support part 130. The movable support part 132 is movable in the up-down direction along a left side surface of the seat back 22 in the movable range that is defined by a movement mechanism (not shown) that is similar to the movement mechanism 42 illustrated in FIG. 3. The movement mechanism (not shown) is controlled by the seat belt ECU 78 similarly to the movement mechanism 42 illustrated in FIG. 3.

In the above description, the retractor 36 is provided inside the seat back 22. However, the retractor 36 may be provided outside the seat back 22, or the movable support part 32 itself may be the retractor.

6. Summary of Embodiments

The present embodiments relate to the seat belt device 70 in which all of the support parts that support the seat belt 28, 128 are provided to the seat 16. The seat belt device 70 includes: the seat state determination unit 98 configured to determine the state of the seat 16; the movable support part 32, 132 configured to support the seat belt 28, 128 in the movable range that is set to the seat back 22; the movement mechanism 42 configured to move the movable support part 32, 132 in the movable range with the motor 44; and the motor control unit 114 configured to control the motor 44 in accordance with the use state of the seat 16 that is determined by the seat state determination unit 98. By the above structure, the position where the vehicle occupant H is restrained by the seat belt 28, 128 can be changed in accordance with the use state of the seat 16. As a result, the position of the seat belt 28, 128 becomes optimum for the vehicle occupant H. Thus, the vehicle occupant H feels more comfortable.

The seat state determination unit 98 includes the seat angle determination unit 100 configured to determine the inclination angle of the seat back 22. The motor control unit 114 is configured to control the motor 44 in accordance with the inclination angle that is determined by the seat angle determination unit 100 (step S3 in FIG. 6). By the above structure, the position of the seat belt 28, 128 is decided in accordance with the inclination angle of the seat back 22. Thus, the position of the seat belt 28, 128 becomes optimum for the vehicle occupant H. Therefore, the vehicle occupant H feels more comfortable.

Figure 6:
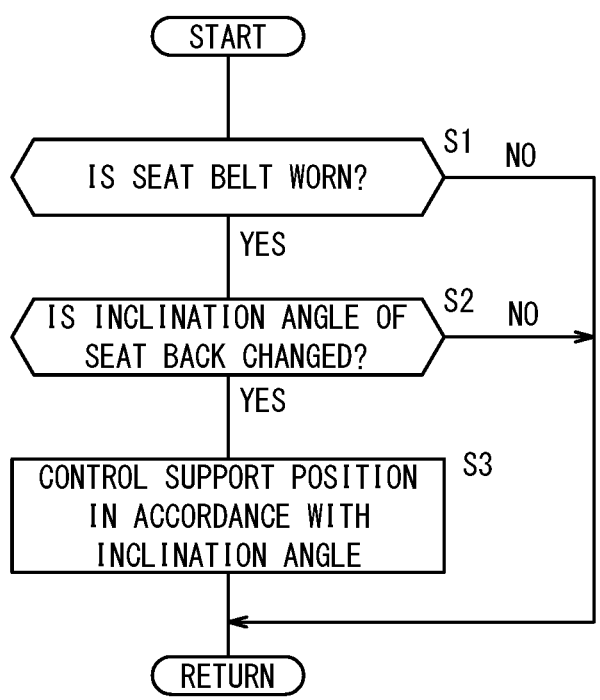
FIG. 6 is a flowchart of a first process.

The motor control unit 114 is configured to control the motor 44 in a manner that, as the seat back 22 is inclined more to the rear side of the seat 16, the movable support part 32, 132 is positioned on the lower end side of the movable range (step S3 in FIG. 6). By the above structure, as the seat back 22 is inclined more, the movable support part 32, 132 is lowered more so that the vehicle occupant H feels as if being restrained by the seat belt 28, 128 at two points. Thus, the degree of freedom for the vehicle occupant H can be improved without the substantial influence on the restraint.

The seat state determination unit 98 includes the vehicle occupant determination unit 102 configured to determine the physique or the posture of the vehicle occupant H who is seated on the seat 16. The motor control unit 114 is configured to control the motor 44 in accordance with the physique or the posture of the vehicle occupant H that is determined by the vehicle occupant determination unit 102 (step S14 and step S16 in FIG. 7, step S22 in FIG. 8, and step S34 and step S36 in FIG. 9). By the above structure, the position of the seat belt 28, 128 is decided in accordance with the physique or the posture of the vehicle occupant H. Thus, the position of the seat belt 28, 128 becomes optimum for the vehicle occupant H. Therefore, the vehicle occupant H feels more comfortable.

If the physique of the vehicle occupant H is larger than the predetermined physique, the motor control unit 114 controls the motor 44 in a manner that the movable support part 32, 132 is positioned on the upper part of the movable range (step S14 in FIG. 7), and if the physique of the vehicle occupant H is smaller than the predetermined physique, the motor control unit 114 controls the motor 44 in a manner that the movable support part 32, 132 is positioned on the lower part of the movable range (step S16 in FIG. 7). By the above structure, if the size of the vehicle occupant H is large, the movable support part 32, 132 is positioned on the upper part, and if the size of the vehicle occupant H is small, the movable support part 32, 132 is positioned on the lower part. Thus, the position of the seat belt 28, 128 becomes optimum for the vehicle occupant H. Therefore, the vehicle occupant H feels more comfortable.

Figure 8:
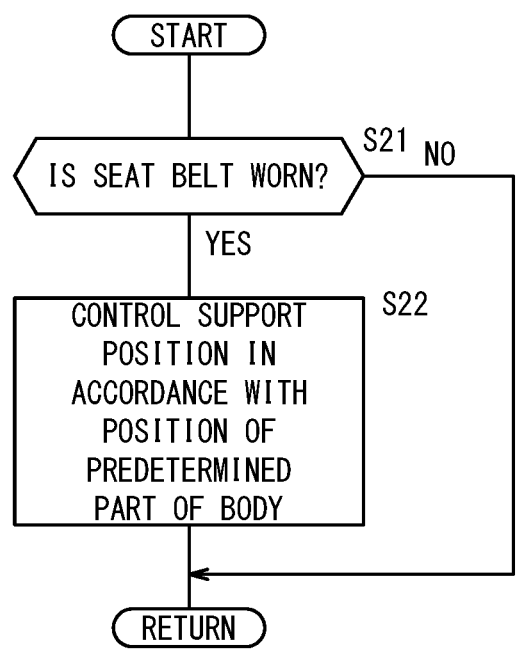
FIG. 8 is a flowchart of a third process.

The motor control unit 114 is configured to control the motor 44 in accordance with the position of the predetermined part of the vehicle occupant H (step S22 in FIG. 8). By the above structure, the position of the movable support part 32, 132 is controlled in accordance with the position of the predetermined part of the vehicle occupant H. Thus, the position of the seat belt 28, 128 becomes optimum for the vehicle occupant H. Therefore, the vehicle occupant H feels more comfortable.

The vehicle occupant determination unit 102 is configured to determine the upper limit position to which the movable support part 32, 132 can move, on the basis of the physique or the posture of the vehicle occupant H, and the motor control unit 114 is configured to control the motor 44 so as to cause the movable support part 32, 132 to approach the upper limit position. By the above structure, the upper limit position of the movable range of the movable support part 32, 132 can be changed for each vehicle occupant H. Thus, the position of the seat belt 28, 128 becomes optimum for the vehicle occupant H. Therefore, the vehicle occupant H feels more comfortable. Moreover, the vehicle occupant H can be appropriately restrained.

The vehicle occupant determination unit 102 is configured to determine the upper limit position on the basis of the position of the arm of the vehicle occupant H. By the above structure, the appropriate position can be determined easily as the upper limit position of the movable range.

Figure 9:
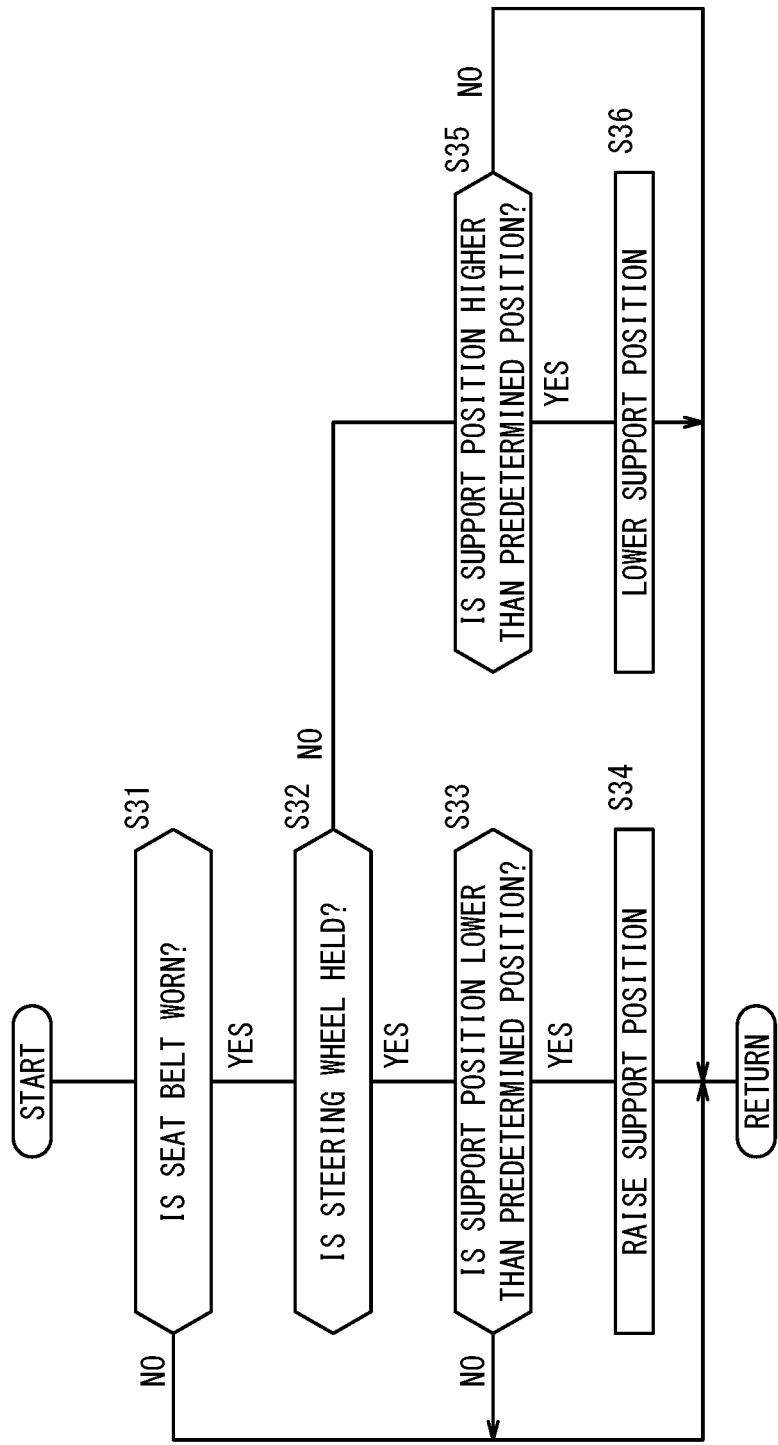
FIG. 9 is a flowchart of a fourth process.

The vehicle occupant determination unit 102 is configured to determine the position of the arm of the vehicle occupant H depending on whether the vehicle occupant H holds the steering wheel 95 (step S32 in FIG. 9). By the above structure, the upper limit position of the movable range can be easily determined.

Figure 10:
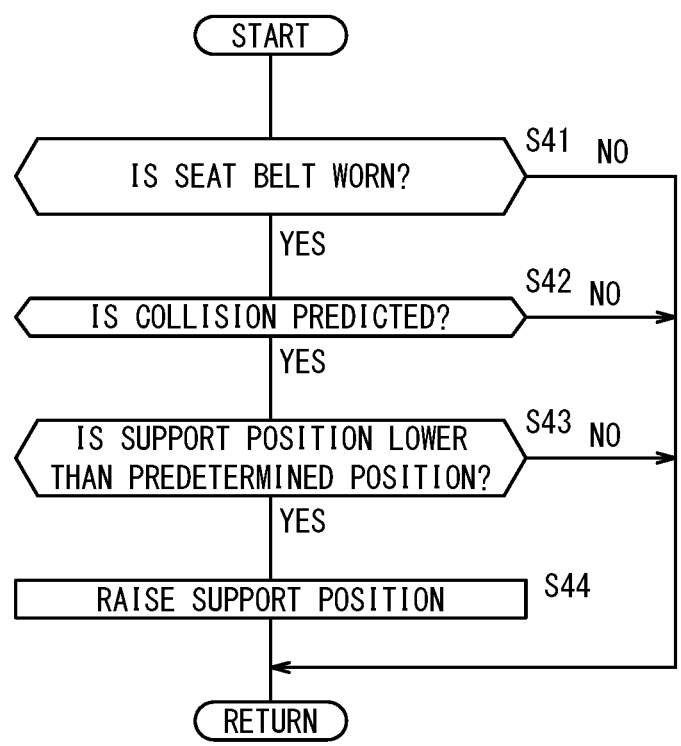
FIG. 10 is a flowchart of a fifth process.

The seat belt device 70 further includes the collision prediction unit 104 configured to predict the collision of the vehicle 10, wherein if the collision prediction unit 104 predicts the collision, the motor control unit 114 controls the motor 44 in a manner that the movable support part 32, 132 is positioned on the upper part of the movable range (step S44 in FIG. 10). By the above structure, the movable support part 32, 132 is positioned on the upper part of the movable range before the occurrence of the collision. Thus, the vehicle occupant H can be more appropriately restrained.

The invention claimed is:

1. A seat belt device in which all support parts that support a seat belt are provided on and attached to a seat having a seat back, the seat belt device comprising:
   a seat state determination unit configured to determine a state of the seat according to at least one of a plurality of sensed conditions;
   a movable support part that is configured to support the seat belt in a movable range, and that is operatively attached to the seat back;
   a movement mechanism configured to move the movable support part in the movable range with a motor;
   a motor control unit configured to control the motor based on the state of the seat that is determined by the seat state determination unit,
   wherein:
   the seat state determination unit includes a seat angle determination unit configured to sense an inclination angle of the seat back, and a vehicle occupant determination unit configured to sense a physique or a posture of a vehicle occupant who is seated on the seat,
   the vehicle occupant determination unit is configured to determine an upper limit position to which the movable support part can move, on a basis of a sensed position of an arm of the vehicle occupant,
   the motor control unit is configured to control the motor in a manner such that, as the seat back is inclined more to a rear side of the seat, the movable support part is positioned on a lower end side of the movable range,
   the motor control unit is configured to control the motor in accordance with the physique or the posture of the vehicle occupant that is determined by the vehicle occupant determination unit, and
   the motor control unit is configured to control the motor so as to cause the movable support part to approach the upper limit position.

2. The seat belt device according to claim 1, wherein the vehicle occupant determination unit is configured to determine the position of the arm of the vehicle occupant depending on whether the vehicle occupant holds a steering wheel.

3. A seat belt device in which all support parts that support a seat belt are provided on and attached to a seat having a seat back, the seat belt device comprising:
- a seat state determination unit configured to determine a state of the seat according to at least one of a plurality of sensed conditions;
- a movable support part that is configured to support the seat belt in a movable range, and that is operatively attached to the seat back;
- a movement mechanism configured to move the movable support part in the movable range with a motor;
- a motor control unit configured to control the motor in accordance with the state of the seat that is determined by the seat state determination unit; and
- a collision prediction unit configured to predict a collision of a vehicle,
- wherein the seat state determination unit includes a seat angle determination unit configured to sense an inclination angle of the seat back,
- wherein the motor control unit is configured to control the motor in a manner such that, as the seat back is inclined more to a rear side of the seat, the movable support part is positioned on a lower end side of the movable range, and
- wherein if the collision prediction unit predicts the collision, the motor control unit controls the motor in a manner such that the movable support part is positioned on an upper part of the movable range.

* * * * *